(12) United States Patent
Heinrich et al.

(10) Patent No.: US 11,817,692 B2
(45) Date of Patent: Nov. 14, 2023

(54) APPARATUS AND METHOD FOR DAMPING VIBRATIONS IN HIGH-VOLTAGE DEVICES

(71) Applicant: SIEMENS ENERGY GLOBAL GMBH & CO. KG, Munich (DE)

(72) Inventors: Ulf Heinrich, Potsdam (DE); Dirk Lehmann, Berlin (DE); Edgar Armando Ramos Cordero, Berlin Charlottenburg (DE); Frank Riedel, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 461 days.

(21) Appl. No.: 17/266,688

(22) PCT Filed: Jul. 9, 2019

(86) PCT No.: PCT/EP2019/068331
§ 371 (c)(1),
(2) Date: Feb. 8, 2021

(87) PCT Pub. No.: WO2020/030362
PCT Pub. Date: Feb. 13, 2020

(65) Prior Publication Data
US 2021/0305798 A1    Sep. 30, 2021

(30) Foreign Application Priority Data
Aug. 8, 2018 (DE) .......................... 102018213305.0

(51) Int. Cl.
*H02G 7/14* (2006.01)
*F16F 7/12* (2006.01)

(52) U.S. Cl.
CPC ............... *H02G 7/14* (2013.01); *F16F 7/128* (2013.01)

(58) Field of Classification Search
CPC ........................................................ H02G 7/14
See application file for complete search history.

(56) References Cited

U.S. PATENT DOCUMENTS 2,246,151 A * 6/1941 Vrooman ................. H01Q 1/12
343/843
5,489,180 A   2/1996 Ichihara et al.
(Continued)

FOREIGN PATENT DOCUMENTS

DE    29619383 U1    3/1998
DE    69412889 T2    5/1999
(Continued)

*Primary Examiner* — Sherman Ng
(74) *Attorney, Agent, or Firm* — Laurence A. Greenberg; Werner H. Stemer; Ralph E. Locher

(57) ABSTRACT

An apparatus for damping vibrations in high-voltage devices has a support arrangement for the high-voltage device. The support arrangement includes support elements interconnected by connection elements. Intermediate elements, in particular coated washers, are arranged between the connection elements and the support elements and/or between different support elements. There is also described a method for damping vibrations, in which connection elements spatially fix support elements of the support arrangement of a high-voltage device in a mechanically stable manner. When mechanical vibrations occur on the high-voltage device, the connection elements dampen the mechanical vibration in a defined manner via a predetermined sliding friction with the support elements and via a spatially predetermined play in relation to the support elements.

17 Claims, 2 Drawing Sheets

(56) References Cited

U.S. PATENT DOCUMENTS

| | | | | |
|---|---|---|---|---|
| 2012/0131877 A1* | 5/2012 | Fang | ........................ | E04H 12/10 |
| | | | | 52/655.1 |
| 2012/0138402 A1* | 6/2012 | Choi | ......................... | F16F 7/08 |
| | | | | 188/381 |
| 2014/0140786 A1* | 5/2014 | McKinlay | ............. | F16B 41/002 |
| | | | | 411/147 |
| 2016/0076581 A1 | 3/2016 | Liebscher et al. | | |

FOREIGN PATENT DOCUMENTS

| | | |
|---|---|---|
| EP | 0783078 A2 | 7/1997 |
| JP | H06323325 A | 11/1994 |
| JP | 2011162943 A | 8/2011 |

* cited by examiner

APPARATUS AND METHOD FOR DAMPING VIBRATIONS IN HIGH-VOLTAGE DEVICES

BACKGROUND OF THE INVENTION

Field of the Invention

The invention relates to an apparatus and a method for damping vibrations in high-voltage devices, having a carrier arrangement for the high-voltage device, said arrangement comprising support elements which are connected to one another via connecting elements.

Apparatuses for high-voltage devices, in particular for devices in the range of up to 1200 kV, are known for example from EP 0 783 078 A2. Here, for example, high-voltage cables, as high-voltage devices, are attached to a power transmission pylon, as apparatus for high-voltage devices, composed of steel profile lattice rods. Further high-voltage devices are, inter alia, for example instrument transformers, high-voltage circuit breakers and/or disconnectors, which are arranged on carriers or carrier arrangements, as apparatus for high-voltage devices, composed of steel profile lattice rods. The lattice rods of the carrier arrangement, which are for example composed of steel, as support elements have in particular an L, T and/or double-T profile and are connected to one another via connecting elements, in particular screws and nuts. Intermediate elements, for example in the form of washers, transmit a clamping force of the screw connection to the lattice rods and lead, by means of a preload force, to a mechanically stiff connection between the lattice rods.

The screws as connecting elements are fastened in bores of the lattice rods in a mechanically fixed manner, wherein embrittlement may occur in the region of the bores and, proceeding therefrom, lattice rods may fracture in the case of mechanical loading, for example by way of wind. In order to prevent this, the preload force of the screw connection is spread, by means of the form of the washers as intermediate elements, to regions of the lattice elements that do not become brittle. As a result, a fixed, stiff mechanical connection with long-term stability is achieved between the lattice elements as support elements of the carrier arrangement for the high-voltage devices.

In the case of mechanical loading of the apparatuses, for example by way of wind and/or earthquakes, some of the loading is compensated by means of the elasticity of the support elements. Elastic regions of the support elements can be deformed elastically and/or plastically, and as a result mechanical energy, which is transmitted to the apparatus by way of wind and/or earth tremors, is absorbed and for example converted into heat energy. High elastic and/or plastic deformation of the support elements, in particular over relatively long periods of time and/or occurring on a frequent basis, leads to fracture of support elements, and thus to irreversible damage and/or failure of the apparatus and thus failure of the high-voltage device. Damping devices in the foundation, for example by means of large springs, can absorb mechanical energy but are elaborate and expensive.

SUMMARY OF THE INVENTION

It is an object of the present invention to specify an apparatus and a method for damping vibrations in high-voltage devices, said apparatus and method solving the problems described above. In particular, it is an object to achieve simple, inexpensive and effective damping of vibrations in order to avoid irreversible damage to the apparatus and thus to the high-voltage device, in particular in the case of environmental influences such as for example wind and/or in the case of earthquakes.

The specified object is achieved according to the invention by way of an apparatus for damping vibrations in high-voltage devices as claimed n and by way of a method for damping vibrations in high-voltage devices, in particular using an above-described apparatus, as claimed. Advantageous refinements of the apparatus according to the invention for damping vibrations in high-voltage devices and/or of the method for damping vibrations in high-voltage devices, in particular using an above-described apparatus, are specified in the dependent claims. In this case, subjects of the main claims can be combined with one another and with features of dependent claims, and features of the dependent claims can be combined with one another.

An apparatus according to the invention for damping vibrations in high-voltage devices comprises a carrier arrangement for elements of the high-voltage device, having support elements which are connected to one another via connecting elements. Intermediate elements, which are configured to damp vibrations, are arranged between the connecting elements and the support elements and/or between different support elements.

The arrangement of intermediate elements between the support elements and/or between the connecting elements and the support elements achieves simple, inexpensive and effective damping of vibrations. As a result, irreversible damage to the apparatus and thus to the high-voltage devices, in particular in the case of environmental influences such as for example wind and/or in the case of earthquakes, can be avoided. The intermediate elements are configured, in conjunction with the connecting elements and/or support elements, to absorb movements or vibrations of the apparatus according to the invention, for example by converting the vibration energy into frictional heat. In contrast to the prior art, vibrations in the apparatus according to the invention are not damped or absorbed exclusively by way of elastic and/or plastic deformation of the support elements, with a stiff connection of the support elements via preloaded connecting elements, but rather movement energy is additionally absorbed by the intermediate elements in cooperation with the support and/or connecting elements.

The intermediate elements can comprise coated washers, which make it possible for the support elements to be connected with one another in a mechanically fixed manner via the connecting elements, with simultaneous flexibility with respect to movements of the support elements in relation to one another, in particular in the case of strong introductions of force, such as for example in the case of wind and/or in the case of earthquakes, by means of sliding friction between the intermediate elements and the support and/or connecting elements. The coating of the washers, in conjunction with the mechanical preload of the connecting elements, permits a predetermined setting of the friction between the intermediate elements and the support and/or connecting elements, and thus a defined damping of movements or vibrations between support elements in dependence on the coefficients of static friction and/or sliding friction of the coating of the intermediate elements with the materials of the support and/or connecting elements.

The intermediate elements can be coated with a polymer, in particular Teflon, PTFE and/or PCTFE, a metal, in particular silver, and/or graphite. As a result, a stable mechanical connection of the support elements with one another is achieved by means of the static friction between the coated intermediate elements and the support and/or connecting elements. In the case of high forces as a result of movements or vibrations between support elements, the coated intermediate elements permit flexible movement of the support elements in relation to one another, wherein movement or vibration energy is absorbed, as a result of the surmounting of the static friction and as a result of the sliding friction. The energy is converted into heat and transferred to the surroundings, in particular the surrounding air, without leading to irreversible plastic deformation or fracture of the support elements. The nature of coating, i.e. the surface roughness and/or the material selection of the coating, makes it possible to set the coefficient of static friction and of sliding friction between the elements in a predetermined manner, whereby, in conjunction with the preload force of the connecting elements, the stiffness of the apparatus, the damping constant and the energy absorption can be set in particular in dependence on the vibration amplitude and/or frequency.

The coating of the intermediate elements can have a determined coefficient of sliding friction on the material of the support elements, in particular in the range of 0.01 to 0.3 and/or in the range of greater than 1. A determined coefficient of sliding friction and/or of static friction makes possible an apparatus according to the invention with a predetermined mechanical stiffness, which, in the case of movements or vibrations from determined occurring forces, damps the movements or vibrations in a predetermined manner. With a low coefficient of sliding friction, relatively small forces, for example in the case of wind, can be absorbed, in particular also in the case of vibrations of higher frequency. With a low coefficient of sliding friction, larger forces, for example in the case of earthquakes, can be absorbed, in particular in the case of vibrations of low frequency. The apparatus nevertheless has a greater stiffness than in the application of the usual damper systems, which is known from the prior art. There is substantially no change in the natural frequency of the carrier arrangement.

The intermediate elements can be and/or comprise washers composed of an elastic material, in particular plastic and/or rubber. As a result, vibration damping is likewise possible by means of the intermediate elements.

The carrier arrangement can be a lattice pylon, in particular a steel framework pylon and/or T-shaped mast. Lattice pylons produce good support properties, for example for power lines, with low costs and low material outlay. A T-shaped pylon describes masts with arms, in particular two arms or more.

The support elements can be T beams, double-T beams and/or L beams, in particular composed of steel. T beams and/or double-T beams, in particular composed of steel, produce high mechanical stiffness, long-term stability and mechanical strength with relatively low dead weight.

The connecting elements can be screws with nuts and/or bolts, in particular composed of steel. As a result, stable mechanical connections are possible, with high preloads. In the case of screw connections, the preload, and thus the damping of the apparatus by means of the preload and in particular by means of the coating and also material selection of the intermediate elements, can be readily set in a defined manner.

The connecting elements can be configured to connect the support elements via openings in the support elements, in particular continuous bores. As a result, an inexpensive connection of support elements is possible, for example via bolts and/or screws with nuts, in a manner mounted via the bores or in the bores.

The openings can be designed in such a way that the connecting elements are mounted in the support elements in a movable manner, in particular with a degree of freedom with respect to movement in dependence on a vibration to be damped and/or a determined earthquake level. The connecting elements can have play in the range of micrometers up to millimeters in the openings. In conjunction with the number of openings or connecting elements, the preload and the coefficient of friction, it is possible to set a mechanical strength, stiffness and absorption of movement energy of the apparatus according to the invention in a targeted manner by means of the play in the range of micrometers up to millimeters.

In each case at least one intermediate element, in particular two different intermediate elements, in conjunction with at least one support element, in particular with two support elements, and with at least one connecting element, in particular at least two different connecting elements, can form a damping element for mechanical vibrations. The friction of the elements in relation to one another produces the damping constant of the damping element for mechanical vibrations.

In each case a stack of different intermediate elements, in particular an intermediate element with a coating and an intermediate element for higher friction, for example without a coating or with a coating having a higher coefficient of sliding friction, in conjunction with at least one support element, in particular with two support elements, and with at least one connecting element, can form a damping element for mechanical vibrations. This is in particular possible with a stack of different intermediate elements between two support elements and/or a stack of different intermediate elements in each case between a respective carrier and a connecting element. By means of a stack of different intermediate elements, in particular with respectively different coefficients of sliding friction, it is possible to set a damping rate of the apparatus in a targeted manner, in particular in dependence on the vibration frequency to be damped and/or the movement force which acts on the apparatus according to the invention.

The apparatus can be comprised by a power transmission pylon, a support mast of a high-voltage circuit breaker and/or a support mast of an instrument transformer. A damping of vibrations and/or movement energy in the pylon permits reliable operation of the high-voltage device, without the risk of failures, in particular as a result of fracture of the pylon for example in the case of a storm and/or earthquakes.

A method according to the invention for damping vibrations in high-voltage devices, in particular using an above-described apparatus, comprises that connecting elements spatially fix support elements of a carrier arrangement of a high-voltage device in a mechanically stable manner, and when mechanical vibrations occur on the high-voltage device, the connecting elements damp the mechanical vibration in a defined manner by means of a predetermined sliding friction with the support elements, and also by means of spatially predetermined play with respect to the support elements.

The connecting elements can damp a mechanical vibration between support elements by way of intermediate elements which are arranged between the support elements and/or between support elements and connecting elements and which have a determined coefficient of sliding friction between support element and intermediate element, in particular in the range of 0.01 to 0.3 and/or in the range of greater than 1, in particular by means of a coating of the intermediate elements, and/or by way of predetermined play between the connecting elements and the support elements, in particular in the range of micrometers up to millimeters.

The advantages of the method according to the invention for damping vibrations in high-voltage devices, in particular using an above-described apparatus, as claimed are analogous to the above-described advantages of the apparatus according to the invention for damping vibrations in high-voltage devices as claimed, and vice versa.

One exemplary embodiment of the invention is illustrated schematically below in FIGS. 1 and 2 and described in more detail in the following text.

DETAILED DESCRIPTION OF THE INVENTION

Figure 1:
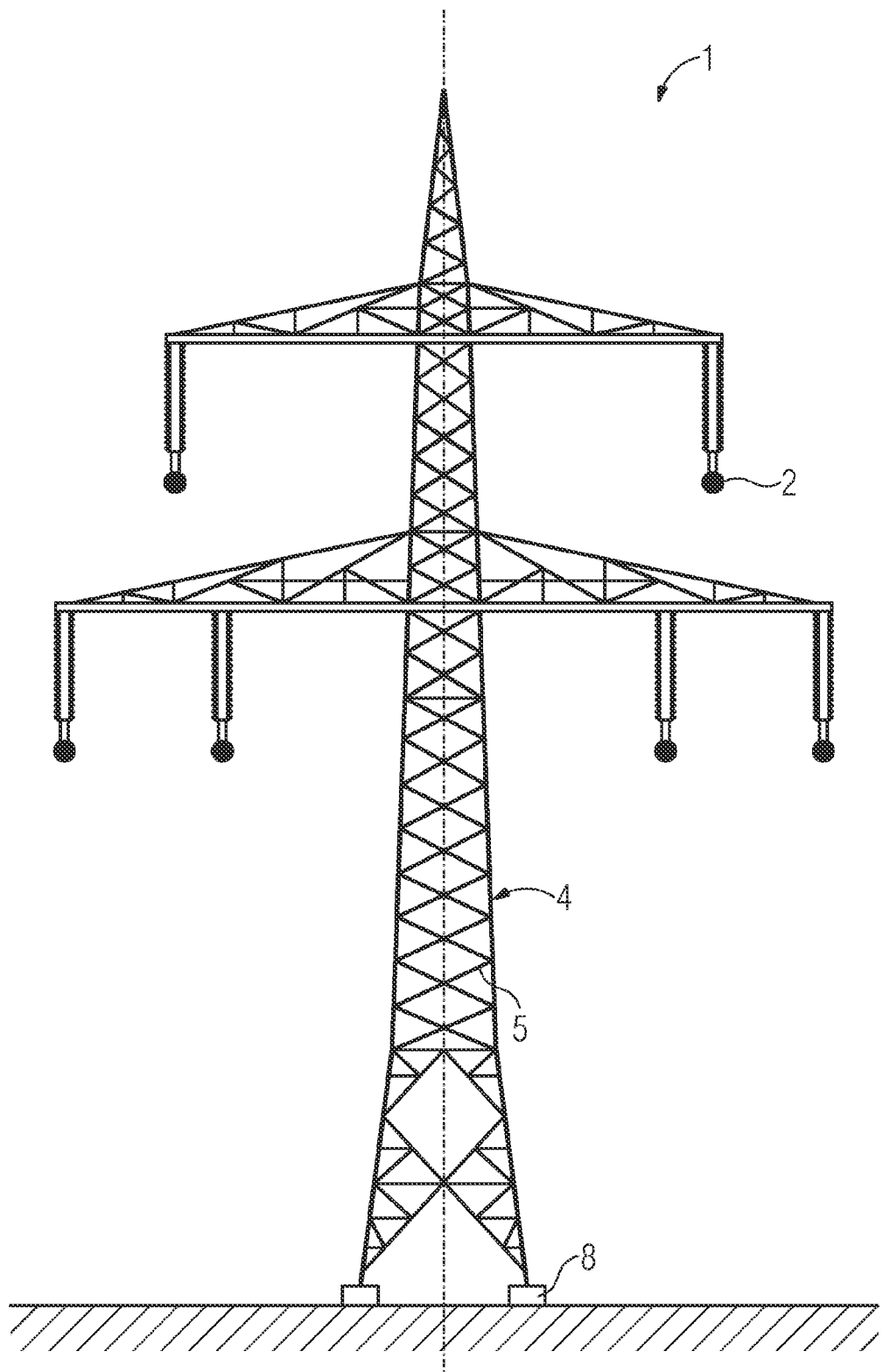
FIG. 1 schematically shows, as high-voltage device 1, power cables 2 on a power transmission pylon 4, which comprises steel profile lattice rods as support elements 5, and FIG. 2 schematically shows a detail of an apparatus 3 according to the invention for damping vibrations in the high-voltage device 1, with coated washers as intermediate elements 7 for the mechanical damping of vibrations in the power transmission pylon 4 of FIG. 1.

A high-voltage device 1 with high-voltage cables or power cables 2 is schematically illustrated in FIG. 1. The electrical cables or lines 2 are fastened, in particular in a hanging manner, to a power transmission pylon as carrier arrangement 4 via isolators. In the exemplary embodiment of FIG. 1, the carrier arrangement 4 is configured with four arms, on which respective cables 2 are arranged. Carrier arrangements 4 can alternatively or additionally bear other high-voltage devices 1, for example transformers, instrument transformers, circuit breakers, disconnectors and/or earth electrodes.

The carrier arrangement 4 has the form of a steel framework pylon or lattice pylon, with in particular steel beams as support elements 5. The support elements 5 are, for example, L-shaped, T-shaped or double-T-shaped, with a high degree of mechanical stability. As an alternative to or in addition to steel beams, it is also possible to use support elements 5 composed of other materials, for example composed of cast iron, wood, plastic, composites and/or carbon. The support elements 5 are arranged relative to one another, and connected to one another, in such a way that a high degree of mechanical stability of the carrier arrangement 4 is produced. By way of example, the support elements 5 are arranged relative to one another in such a way that triangles, quadrilaterals, in particular parallelograms, and/or pyramid shapes are formed or enclosed by the support elements 5. The carrier arrangement 4 is arranged on a foundation 8, in particular composed of concrete, on the ground.

As a result of the construction of the carrier arrangement 4 in the form of a steel framework pylon or lattice pylon, a high degree of mechanical strength and stability is achieved with relatively low weight. In dependence on the connection of the support elements 5 with one another, for example in a mechanically stiff manner by way of welding and/or releasable connections such as for example by means of screws and/or bolts, a high degree of stiffness of the carrier arrangement 4 is achieved. In the case of external loading of the carrier arrangement 4 by way of wind/storms and/or earthquakes, a high degree of stiffness can lead to problems, in particular irreversible damage up to fracture of support elements 5, and/or snapping of the carrier arrangement 4. As a result, the high-voltage device 1 is irreversibly destroyed, and disruptions and failures occur in the connected electrical power grid. Measures against damage and/or destruction of the carrier arrangement 4, such as, for example, vibration dampers in the foundation, are elaborate and expensive and are often able to damp only certain frequencies of mechanical vibrations in the carrier arrangement 4.

According to the invention, a damping of vibrations in the carrier arrangement 4 is achieved by a reduction in the stiffness of the carrier arrangement 4 in particular as of a determined threshold value of the occurring forces. The reduction in the stiffness of the carrier arrangement 4 is achieved by means of the possibility of movements of the support elements 5 in relation to one another. As a result, it is possible, for example in the case of environmental influences such as storms and/or earthquakes, for vibrations in the carrier arrangement 4 to be damped and for a high degree of mechanical stability of the carrier arrangement 4 to be achieved or obtained. The possibility of movements of the support elements 5 in relation to one another with a simultaneously high degree of mechanical stability of the carrier arrangement 4 is achieved in that the support elements 5 are not fixedly welded to one another but rather are connected to special intermediate elements via connecting elements. The connecting elements are for example guided through bore holes in the support elements 5 and, in interaction with the size of the bore holes and the intermediate elements, produce damping elements.

Figure 2:
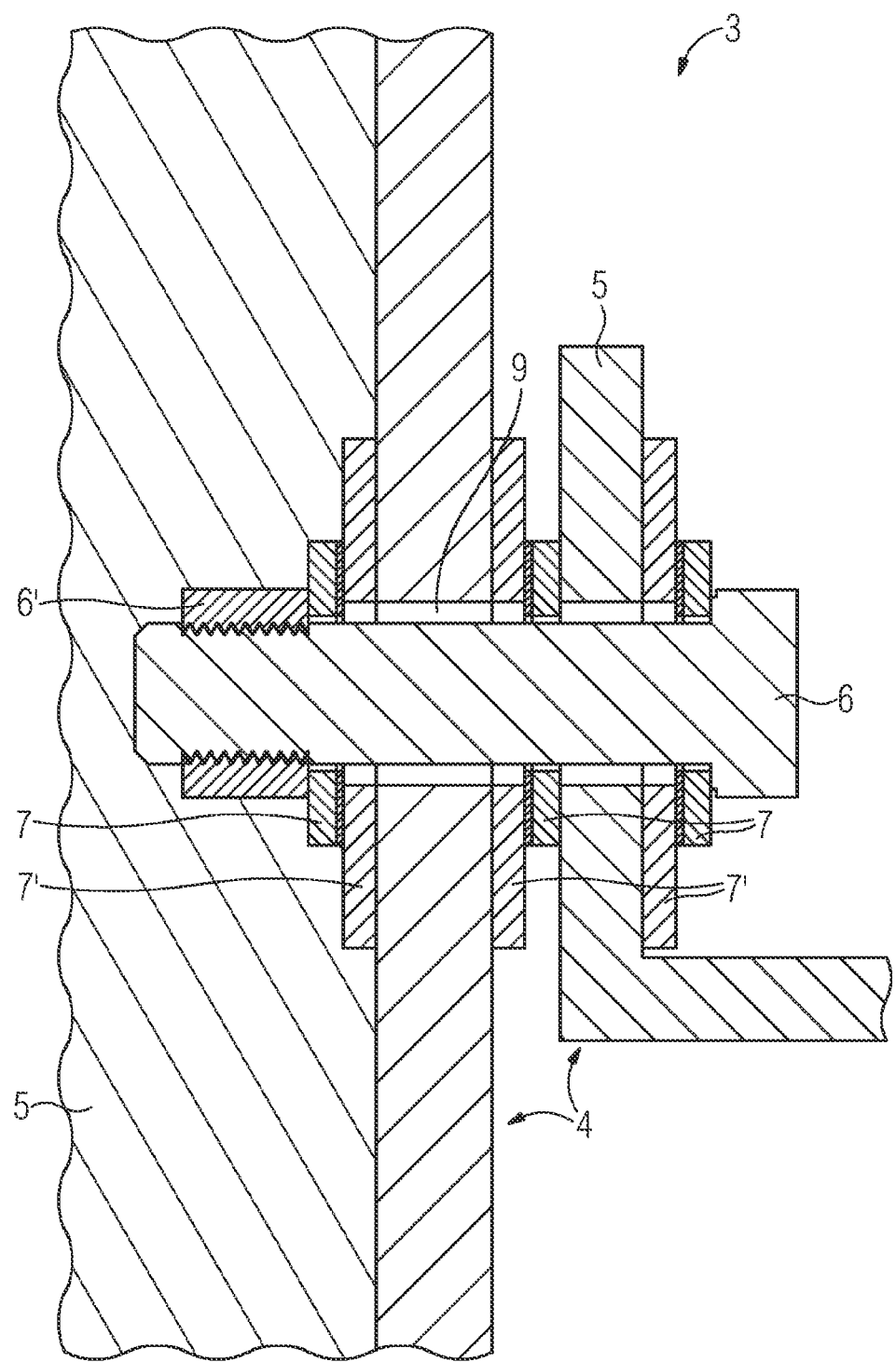

A detail of an apparatus 3 according to the invention for damping vibrations in a high-voltage device 1 is schematically illustrated in FIG. 2, with a carrier arrangement 4 as per FIG. 1. Connecting elements 6, 6' are guided in openings, in particular bores or bore holes 9 of the support elements 5, and bring about mechanical damping of vibrations in the carrier arrangement 4 by means of coated washers as intermediate elements 7, 7'. The coated washers as intermediate elements 7, 7' are arranged between the connecting elements 6, 6' and the support elements 5 and between different support elements 5. The coating is selected in accordance with predefined coefficients of sliding friction in order to achieve the desired damping with a defined degree of mechanical stiffness of the carrier arrangement 4.

The washers 7 are coated, for example, with layers with low coefficients of sliding friction, in particular in the range of 0.01 to 0.3, in order to achieve damping in the case of low forces and/or high frequencies of vibration. As an alternative or in addition, the washers 7' are coated, for example, with layers with high coefficients of sliding friction, in particular in the range of greater than 1, in order to achieve damping in the case of large forces and/or low frequencies of vibration. As illustrated in FIG. 2, it is also possible for stacks with identical and/or different washers 7 as intermediate elements to be arranged between the connecting elements 6, 6' and the support elements 5 and between different support elements 5. Damping is thus possible over a wide range of forces and vibration frequencies, in particular low and high vibration frequencies.

By way of example, in FIG. 2, which shows a detail of an apparatus 3 according to the invention for damping vibrations, two L-shaped support elements 5 of a carrier arrangement 4, in particular of a power transmission pylon, are connected to one another in a mechanical manner via connecting elements, in particular a screw 6 and a nut 6'. In each case a stack composed of a washer 7 as intermediate element with a layer with a low coefficient of sliding friction and of a washer 7' as intermediate element with a layer with a high coefficient of sliding friction is arranged between the two L-shaped support elements 5 and is arranged between a support element 5 and the screw 6, and also between a support element 5 and the nut 6'. As a result, a damping element is formed which damps vibrations in the carrier arrangement 4 over a large frequency and/or force range. Below a threshold value of the different and/or oppositely directed forces on the support elements 5, that is to say below a threshold value of the difference in the forces on the two support elements 5, the static friction leads to a stable, stiff, spatially fixed carrier arrangement 4 having support elements 5 whose relative positions do not change.

In the case, for example, of wind and/or earthquakes, forces which are greater than the threshold value act on the support elements 5, and the washers 7, 7' begin to slide in a predefined manner as result of the coating, that is to say the sliding friction takes effect. As a result, the vibration in the case of predetermined forces and/or frequencies is damped, that is to say the movement energy, which is transmitted to the support elements 5 for example by the wind and/or an earthquake, is converted into heat energy by means of the sliding friction. The movement and/or the vibration of the support elements 5 in relation to one another, and thus of the carrier arrangement 4 as a whole, are/is damped.

The exemplary embodiments described above can be combined with one another and/or can be combined with the prior art. By way of example, it is thus possible for carrier arrangements 4 to bear, instead of cables or instead of lines 2, other elements 2 of the high-voltage device 1, in particular transformers, circuit breakers, disconnectors and/or instrument transformers. The carrier arrangements 4 can have no, one, two or more arms and can for example have a triangular or quadrilateral, in particular square, cross section. The carrier arrangements 4 can have the form of a framework pylon or lattice pylon, or can comprise only individual support elements 5. Support elements 5 can for example be flat in the manner of a strip, L-shaped, T-shaped and/or double-T-shaped, and can be composed for example of steel, iron, wood, plastics, composites, ceramics and/or carbon or can comprise said substances. The connecting elements 6 can comprise screws 6 and nuts 6', and/or can for example comprise bolts, wherein in each case at least one intermediate element 7, 7', in particular in the form of a coated washer, is arranged in particular between bolt 6 and support element 5. The support elements 5 are connected to one another via connecting elements 6, wherein connecting elements 6 are for example guided in bore holes 9 through the support elements 5. The size of the bore holes 9 as continuous openings in the support elements 5 determines, inter alia, the degrees of freedom with respect to movement of the connecting elements 6 of the apparatus 3 for damping vibrations, and thus, inter alia, the damping rate and the damping amplitude, and the maximum movement of the support elements 5 in relation to one another.

Stacks of intermediate elements 7 can have identical and/or two or more different intermediate elements 7, in particular washers with different coatings. Individual intermediate elements 7 can have different coatings on different sides, or can have stacks of layers composed of different substances. The intermediate elements 7 and/or stacks of intermediate elements 7, 7' can for example be arranged only between support elements 5, or only between connecting element 6, 6' and support element 5, or only between connecting elements 6, 6'.

LIST OF REFERENCE DESIGNATIONS

1 High-voltage device
2 Element of the high-voltage device, in particular cable
3 Apparatus for damping vibrations
4 Carrier arrangement, for example power transmission pylon
5 Support element, for example steel beam
6 Connecting element (screw 6, nut 6')
7 Intermediate element (coated washer 7 for low friction and coated washer for increased friction 7')
8 Foundation
9 Opening in the support element, for example continuous bore

The invention claimed is:

1. An apparatus for damping vibrations in a high-voltage device, the apparatus comprising:
a carrier arrangement for elements of the high-voltage device, the carrier arrangement including support elements that are connected to one another via connecting elements;
intermediate elements configured to damp vibrations, said intermediate elements being arranged between said connecting elements and said support elements and/or between different said support elements;
a coating of said intermediate elements having a determined coefficient of sliding friction on a material of said support elements, and wherein the coefficient of sliding friction lies in a range of 0.01 to 0.3 and/or above 1.

2. The apparatus according to claim 1, wherein said intermediate elements are coated washers.

3. The apparatus according to claim 1, wherein said intermediate elements are coated with at least one material selected from the group consisting of a polymer, a metal, and a graphite.

4. The apparatus according to claim 3, wherein said intermediate elements are coated with PTFE, PCTFE, and/or silver.

5. The apparatus according to claim 1, wherein said intermediate elements are washers composed of an elastic material selected from the group consisting of plastic and rubber.

6. The apparatus according to claim 1, wherein said carrier arrangement is a lattice pylon with a steel framework and/or a T-shaped support.

7. The apparatus according to claim 1, wherein said support elements are T beams or double-T beams composed of steel.

8. The apparatus according to claim 1, wherein said connecting elements are screws with nuts and/or bolts.

9. The apparatus according to claim 8, wherein said connecting elements are configured to connect said support elements via openings formed in said support elements.

10. The apparatus according to claim 9, wherein said openings are configured to enable said connecting elements to be movably mounted in said support elements with a degree of freedom adapted to an expected vibration to be damped and/or a predetermined earthquake intensity level.

11. The apparatus according to claim 9, wherein said connecting elements have a play within said openings in a range of micrometers and up to millimeters.

12. The apparatus according to claim 1, wherein in each case at least one intermediate element in conjunction with at least one support element and with at least one connecting element forms a damping element for damping mechanical vibrations.

13. The apparatus according to claim 12, wherein the damping element for damping mechanical vibrations is formed by at least two different intermediate elements in conjunction with at least two support elements, and with at least two different connecting elements.

14. The apparatus according to claim 1, wherein a damping element for damping mechanical vibrations is formed by a stack of different intermediate elements, the stack having an intermediate element with a coating for lower friction and an intermediate element with higher friction, in between two support elements and/or between a respective carrier and a connecting element.

15. The apparatus according to claim 1, wherein the apparatus is comprised by a power transmission pylon, a support structure of a high-voltage circuit breaker and/or a support structure of an instrument transformer.

16. A method for damping vibrations in a high-voltage device, the method which comprises:

spatially fixing support elements of a carrier arrangement of the high-voltage device with connecting elements in a mechanically stable arrangement;

damping mechanical vibrations that occur on the high-voltage device with the connecting elements in a defined manner by way of a predetermined sliding friction relative to the support elements, and also by way of spatially predetermined play with respect to the support elements; and damping the mechanical vibrations between support elements with intermediate elements arranged between the support elements and/or between support elements and connecting elements and which have a defined coefficient of sliding friction between the support element and the intermediate element within a range of 0.01 to 0.3 and/or a range of greater than 1 due to a coating of the intermediate elements.

17. The method according to claim 16, which comprises setting the play between the connecting elements and the support elements in a range from micrometers up to millimeters.

* * * * *